United States Patent
Park et al.

(10) Patent No.: US 9,791,982 B2
(45) Date of Patent: Oct. 17, 2017

(54) TOUCH SCREEN PANEL HAVING COMPENSATION PATTERNS

(71) Applicant: SAMSUNG DISPLAY CO., LTD., Yongin, Gyeonggi-Do (KR)

(72) Inventors: Jung-Mok Park, Yongin (KR); Hyung-Chul Kim, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 379 days.

(21) Appl. No.: 14/492,668

(22) Filed: Sep. 22, 2014

(65) Prior Publication Data
US 2015/0084922 A1  Mar. 26, 2015

(30) Foreign Application Priority Data
Sep. 24, 2013 (KR) .................. 10-2013-0113117

(51) Int. Cl.
*G06F 3/045* (2006.01)
*G06F 3/044* (2006.01)

(52) U.S. Cl.
CPC .................... *G06F 3/044* (2013.01)

(58) Field of Classification Search
CPC ..................................................... G06F 3/044
USPC ........................................................ 345/174
See application file for complete search history.

(56) References Cited

U.S. PATENT DOCUMENTS

| 2007/0057344 A1* | 3/2007 | Lee ............... H01L 23/5223 257/532 |
| 2011/0242050 A1 | 10/2011 | Byun et al. |
| 2012/0287079 A1* | 11/2012 | Sato ............... G06F 3/044 345/174 |
| 2016/0334933 A1* | 11/2016 | Ono ............... G06F 3/044 |

FOREIGN PATENT DOCUMENTS

| KR | 10-2003-0061070 A | 7/2003 |
| KR | 10-2006-0013109 A | 2/2006 |
| KR | 10-2011-0112128 | 10/2011 |

* cited by examiner

Primary Examiner — Jonathan Blancha
(74) Attorney, Agent, or Firm — Lee & Morse, P.C.

(57) ABSTRACT

A touch screen panel includes a substrate having active and non-active areas, a plurality of first sensing electrodes in the active area, a plurality of second sensing electrodes in the active area, a plurality of row outer lines in the non-active area, a plurality of column outer lines in the non-active area, and first compensation patterns in the non-active area. The plurality of first sensing electrodes may be arranged in rows, each row line having a first end and a second end. The plurality of second sensing electrodes may be arranged in columns, each column having a first end and a second end. The plurality of row outer lines may be connected to respective first row line end. The plurality of column outer lines may be connected to respective first column line ends. The first compensation patterns may be connected respectively to the second row line ends.

20 Claims, 6 Drawing Sheets

TOUCH SCREEN PANEL HAVING COMPENSATION PATTERNS

CROSS-REFERENCE TO RELATED APPLICATION

The present application claims priority under 35 U.S.C. §119 to Korean Patent Application No. 10-2013-0113117, filed on Sep. 24, 2013, in the Korean Intellectual Property Office, and entitled: "TOUCH SCREEN PANEL," which is incorporated by reference herein in its entirety.

BACKGROUND

1. Field

Embodiments relate to a touch screen panel.

2. Description of the Related Art

A touch screen panel is a device that allows a user's instruction to be input by selecting an instruction content displayed on a screen of an image display device or the like with a user's hand or an object. The touch screen panel may be on a front face of the display device to convert a contact position into an electrical signal. The user's hand or object may be directly in contact with the touch screen panel at the contact position. The instruction content selected at the contact position may be input as an input signal to the image display device. The touch screen panel may recognize, as an input signal, a touch event generated in an active area by having sensing electrodes arranged for each line in the active area. In the touch screen panel, outer lines respectively connected to the sensing electrodes for each line may be in a non-active area formed at the periphery of the active area.

SUMMARY

A touch screen panel may include a substrate having active and non-active areas, a plurality of first sensing electrodes in the active area, a plurality of second sensing electrodes in the active area, a plurality of row outer lines in the non-active area, a plurality of column outer lines in the non-active area, and first compensation patterns in the non-active area. The non-active area may be at or around the periphery of the active area. The plurality of first sensing electrodes may be arranged in row lines, respective row lines having a first row line end and a second row line end opposite the first row line end. The plurality of second sensing electrodes may be arranged in column lines in the active area, respective column lines having a first column line end and a second column end opposite the first column line end. The plurality of row outer lines may be electrically connected to respective first row line ends. The plurality may be electrically connected to respective first column line ends. The first compensation patterns may be electrically connected respectively to the second row line ends.

The row lines may extend along a first direction. The plurality of second sensing electrodes may be interspersed between the first sensing electrodes. The column lines may extend along a second direction intersecting the first direction. The touch screen panel may further include second compensation patterns between the first compensation patterns. The second compensation patterns may be connected to respective second column line ends. The first compensation patterns may extended such that adjacent first compensation patterns are opposite to each other at a predetermined interval. The second compensation patterns may be extended such that adjacent second compensation patterns are opposite to each other at a predetermined interval.

The first and second compensation patterns may be alternately arranged along the second direction. Each of the first and second compensation patterns may be extended opposite to an adjacent compensation pattern at a predetermined interval. The first and second compensation patterns may be spaced apart from each other by about 0.03 mm. Each of the first and second compensation patterns may have a bent or branched shape in a direction toward the adjacent compensation pattern. The first and second compensation patterns may be in the same layer as the sensing electrodes in the non-active area. The touch screen panel may further include third compensation patterns electrically connected to the second sensing electrodes, the third compensation patterns each having at least one portion overlapped with an adjacent first compensation pattern. The touch screen panel may further include second insulating patterns formed between the first compensation patterns and the third compensation patterns.

The touch screen panel may further include a plurality of first connecting patterns connecting the first sensing electrodes along the first direction. The touch screen panel may further include a plurality of second connecting patterns connecting the second sensing electrodes along the second direction. The first connecting patterns may be separated from the first sensing electrodes, and connect the first sensing electrodes for each line along the first direction while being electrically connected to the first sensing electrodes above or below the first sensing electrodes. The touch screen panel may further include first insulating patterns between the first connecting patterns and the second connecting patterns.

The first and second directions may be perpendicular to each other. The first and second compensation patterns may be complementary to the adjacent compensation pattern. One compensation pattern of adjacent first and second compensation patterns may have at least two prongs, and the other compensation pattern may have at least one prong. The prong of the latter may be between two adjacent prongs of the former. The first compensation pattern may have at least one prong and the second compensation pattern may have at least two prongs. All prongs may lie in a common plane.

BRIEF DESCRIPTION OF THE DRAWINGS

Features will become apparent to those of skill in the art by describing in detail exemplary embodiments with reference to the attached drawings in which.

DETAILED DESCRIPTION

Figure 1A:
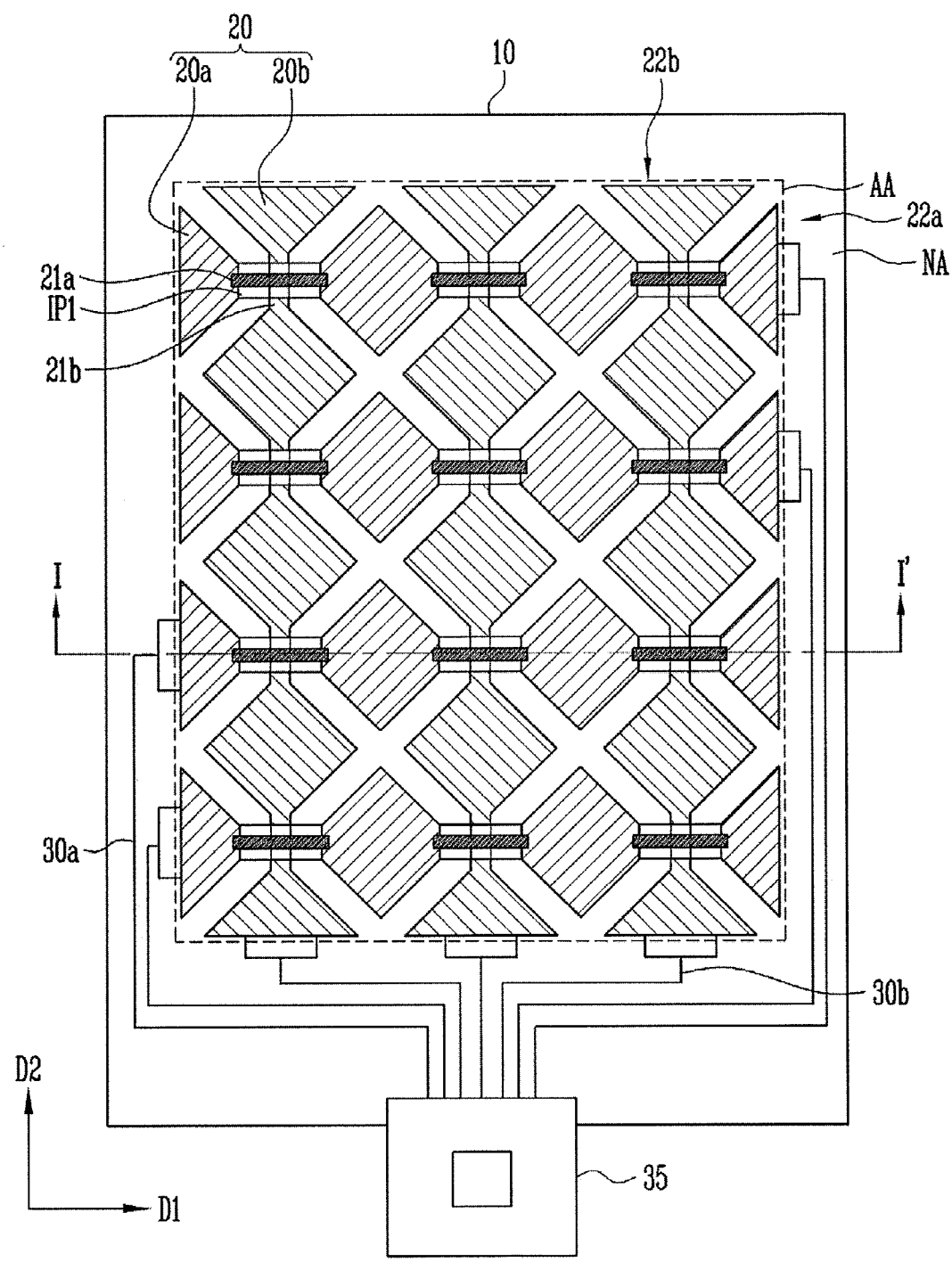
FIG. 1A illustrates a schematic plan view of a touch screen panel.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art. The described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Figure 1B:
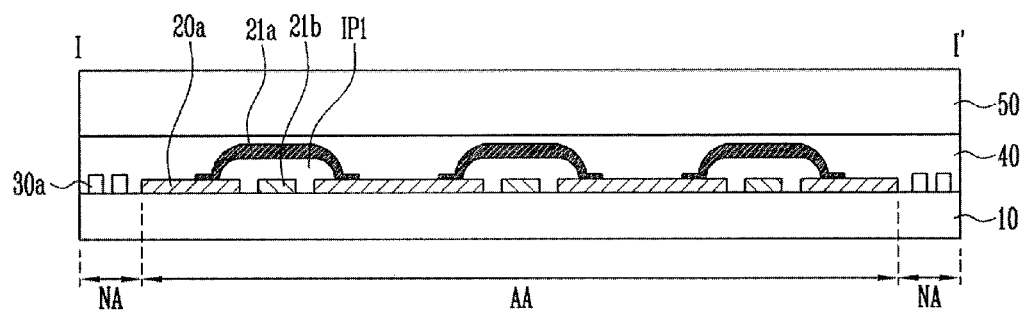
FIG. 1B illustrates a schematic sectional view of the touch screen panel illustrated in FIG. 1A.

FIGS. 1A and 1B illustrate schematic plan and sectional views of a touch screen panel. Referring to FIGS. 1A and 1B, the touch screen panel includes a substrate 10, sensing electrodes 20 and outer lines 30. The touch screen panel may include first and second connecting patterns 21a and 21b, first insulating patterns IP1, a pad portion 35, an adhesive layer 40 and a window substrate 50. The substrate 10 may be divided into an active area AA overlapped with an image display area and may have the sensing electrodes 20 formed therein so that a touch input is possible, and a non-active area NA positioned at the periphery of the active area AA and having the outer lines 30 formed therein. The non-active area NA may be a light-shielding area overlapped with an image non-display area, and may have a shape surrounding the active area AA in which an image is displayed.

The sensing electrodes 20 may include a plurality of first sensing electrodes 20a distributed in the active area AA on the substrate 10, and electrically connected along a first direction D1. A plurality of second sensing electrodes 20b may be distributed between the first sensing electrodes 20a, for example, not overlapped with the first sensing electrodes 20a, and electrically connected along a second direction D2 intersecting the first direction D1. The first sensing electrodes 20a and the second sensing electrodes 20b may be alternately positioned and connected along different directions from each other. For example, the first sensing electrodes 20a may be connected along a row direction (horizontal direction) so that row lines 22a of the first sensing electrodes 20a are respectively connected to row outer lines 30a, and the second sensing electrodes 20b may be connected along a column direction (vertical direction) so that column lines 22b of the second sensing electrodes 20b are respectively connected to column outer lines 30b. The first sensing electrodes 20a and the second sensing electrodes 20b may be in the same layer on the substrate 10. Alternatively or additionally, the first sensing electrodes 20a and the second sensing electrodes 20b may be in different layers from each other. For example, the first sensing electrodes 20a and the second sensing electrodes 20b may be formed in different layers from each other with the substrate 10 or the adhesive layer 40 interposed therebetween. The sensing electrodes 20 may have a diamond shape, and/or the material and shape of the sensing electrodes 20 may have various modifications thereof, for example, use of shapes other than or in addition to diamonds.

The first connecting patterns 21a may connect the first sensing electrodes 20a along the first direction D1, and the second connecting patterns 21b may connect the second sensing electrodes 20b along the second direction D2. The first connecting patterns 21a may have patterns separated from the first sensing electrodes 20a. The first connecting patterns 21a may connect the first sensing electrodes 20a for each line along the first direction D1 while being electrically connected to the first sensing electrodes 20a above or below the first sensing electrodes 20a. The second connecting patterns 21b may be formed as patterns directly connected to each other in the same layer as the second sensing electrodes 20b. The first insulating patterns IP1 may be formed between the first connecting patterns 21a and the second connecting patterns 21b.

Like or similar to the first and second sensing electrodes 20a,b, the first connecting patterns 21a may be formed of a transparent electrode material or a low-resistance opaque metal material. The width, thickness or length of the first connecting patterns 21a may be adjusted so that the visualization of the first connecting patterns 21a can be prevented. When the first connecting patterns 21a, for example, are formed of a low-resistance opaque metal material, the first connecting patterns 21a may be simultaneously formed in a process of forming the row outer lines 30a in the non-active area NA, thereby further simplifying the process. The first connecting patterns 21a may be formed of the same material in the same layer as the row outer lines 30a. The width of the first connecting patterns 21a may be limited, for example, so that the visualization of the first connecting patterns 21a can be prevented. The width of the first connecting patterns 21a may be formed narrower than that of the second connecting patterns 21b formed of a transparent electrode material. The first connecting patterns 21a may be, for example, diagonally inclined so that the visualization of the first connecting patterns 21a can be more effectively prevented. The second connecting patterns 21b may be formed, together with the first and second sensing electrodes 20a,b of a transparent electrode material, and the first connecting patterns 21a may be formed of a low-resistance opaque metal material. When the second connecting patterns 21b are formed of a transparent electrode material, for example, the second sensing electrodes 20b and the second connecting patterns 21b may be integrally patterned in a process of patterning the transparent electrode material, thereby simplifying the process.

The row outer lines 30a and column outer lines 30b may connect the lines of the first sensing electrodes 20a and the second sensing electrodes 20b, respectively, along the respective first and second directions D1 and D2 to an external driving circuit. For example, the row and column outer lines 30a,b may be respectively electrically connected to the row lines of the first sensing electrodes 20a and the column lines of the second sensing electrodes 20b, respectively, to connect the first and second sensing electrodes 20a and 20b to an external driving circuit such as a position detecting circuit through the pad portion 35. The row and column outer lines 30a,b may be disposed in the non-active area NA at an outer portion of the touch screen panel while avoiding the active area AA in which an image is displayed. Because the material of the row and column outer lines 30a,b may be selected in a wide range, the row and column outer lines 30a,b may be formed of not only a transparent electrode material used to form the first and second sensing electrodes 20a,b but also a low-resistance metallic material such as molybdenum (Mo), silver (Ag), titanium (Ti), copper (Cu), aluminum (Al), and/or Mo/Al/Mo.

The adhesive layer 40 may join together the window substrate 50 and the substrate 10 having the row and column outer lines 30a,b formed thereon. The adhesive layer 40 may cover the entire front surface of the substrate 10. The adhesive layer 40 may include, for example, an optically clear adhesive (OCA).

The window substrate 50 may be a substrate opposite to the substrate 10. The window substrate 50 may be partially or on the entire front side of the touch screen panel, where a touch event occurs and light may be radiated. The window substrate 50 may have a size and a shape approximately identical to those of the substrate 10. A colored printing layer that may conceal the row and column outer lines 30a,b may be provided in an area of the window substrate 50, corresponding to the non-active area NA.

The touch screen panel may be an electrostatic capacitive touch screen panel. If a contact object such as a user's finger or stylus pen comes in contact with the touch screen panel, for example, a change in capacitance, caused by a contact position, may be transferred from the sensing electrodes 20 to the driving circuit via the outer line 40. The change in capacitance may be converted into an electrical signal by X and Y input processing circuits, thereby detecting the contact position.

Figure 2A:
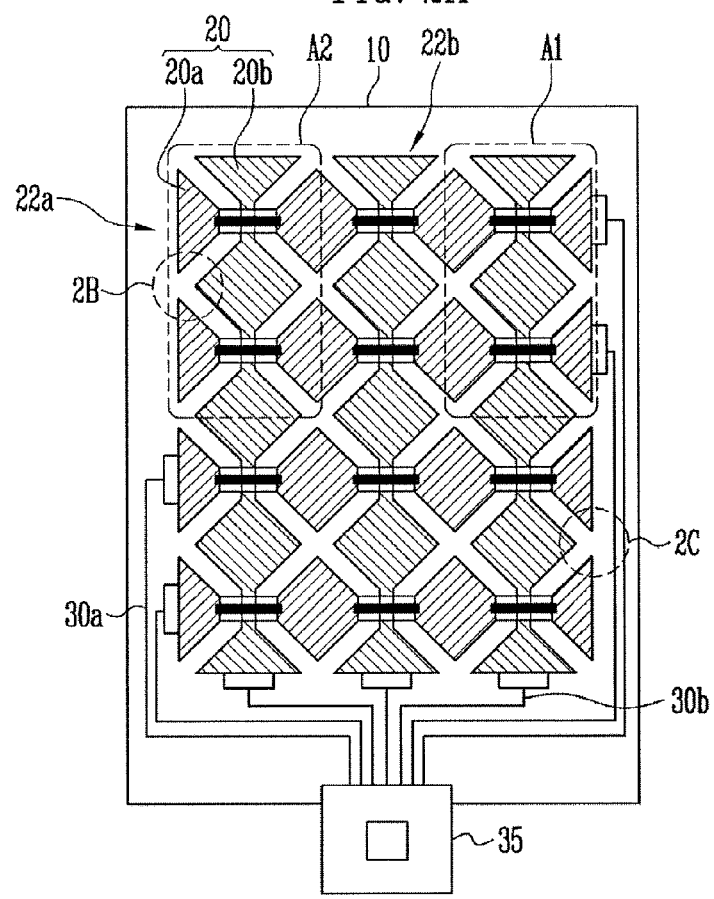
FIG. 2A further illustrates the touch screen panel in FIG. 1A.
Figure 2B:
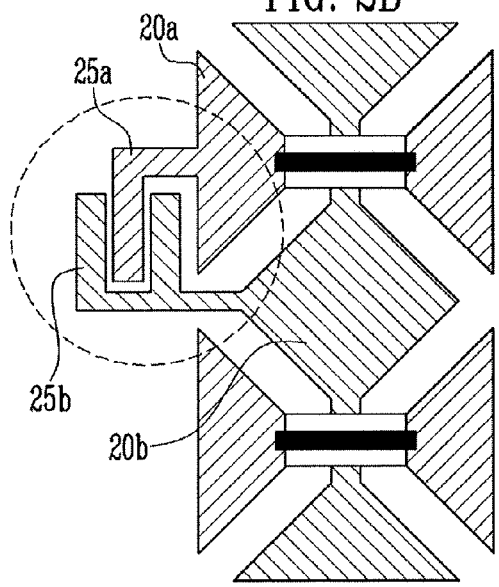
FIGS. 2B and 2C illustrate enlarged views of compensation patterns formed in the touch screen panel of FIG. 2A.
Figure 2C:
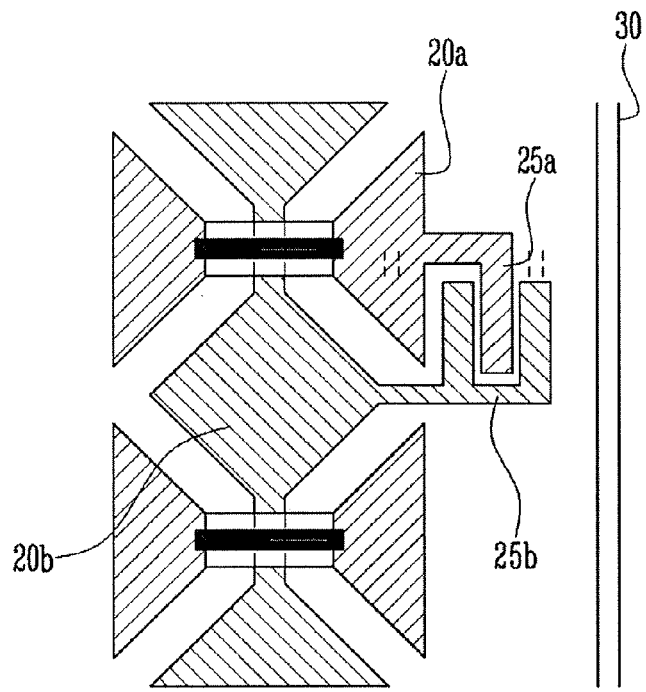

FIGS. 2B and 2C illustrate enlarged views of compensation patterns formed in the touch screen panel of FIG. 2A and FIG. 1A. Referring to FIGS. 2B and 2C, the touch screen panel may include first compensation patterns 25a and second compensation patterns 25b, configured to decrease a variation in electrical characteristics in the active area AA. The first sensing electrodes 20a and the second sensing electrodes 20b may be distributed in the active area AA, and the row and column outer lines 30a,b may be respectively connected to one end portion of the lines of the sensing electrodes. The first and second sensing electrodes 20a,b positioned in a first area A1 to which the row outer lines 30a are connected, and the first and second sensing electrodes 20a,b positioned in a second area A2 opposite to the first area A1 may have different resistance values from each other. The first area A1 is an area in which current may be flowed from the row outer lines 30a. In the first area A1, the resistance value may be formed relatively low. The second area A2 may be a floating area in which the resistance value may be formed relatively high. As the electrical characteristics of the sensing electrodes 20 may have a variation for each area, an RC delay value or capacitance charging time may be increased in an end area of the sensing electrodes 20. The touch sensitivity of the sensing electrodes may be deteriorated, or the noise preventing ability of the sensing electrodes may be reduced.

The compensation patterns 25a and 25b may be configured to compensate for a variation in capacitance, and may be, for example, at row line 22a ends and column line 22b ends, respectively of the first and second sensing electrodes 20a,b so that the variation in electrical characteristics in the active area AA may be decreased, thereby helping to prevent the lowering of touch sensitivity. The first compensation patterns 25a may be electrically connected to the other end portions opposite to one end portions of the first sensing electrodes 20a to which the row outer lines 30a are connected. For example, the first compensation patterns 25a may be at one side of the non-active area NA adjacent to the second area A2. The second compensation patterns 25b may be between the first compensation patterns 25a. The second compensation patterns 25b may be electrically connected to the second sensing electrodes 20b. The second compensation patterns 25b may be adjacent to the first compensation patterns 25a to compensate for a variation in capacitance of the first and second sensing electrodes 20a,b in the second area A2. The positions of the second compensation patterns 25b may be opposite the side to which the column outer lines 30b are connected.

Figure 2D:
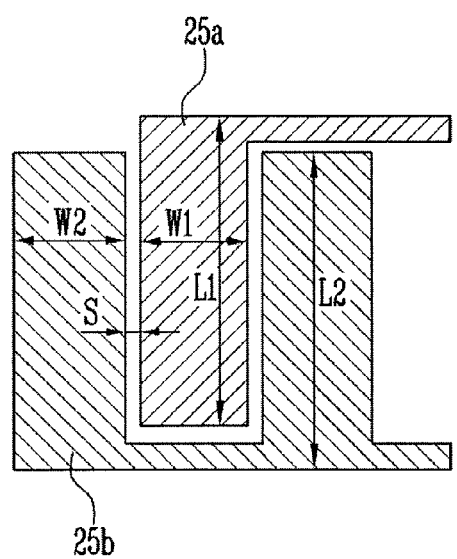
FIG. 2D illustrates an enlarged view of the compensation pattern shown in FIG. 2B.
Figure 3A:
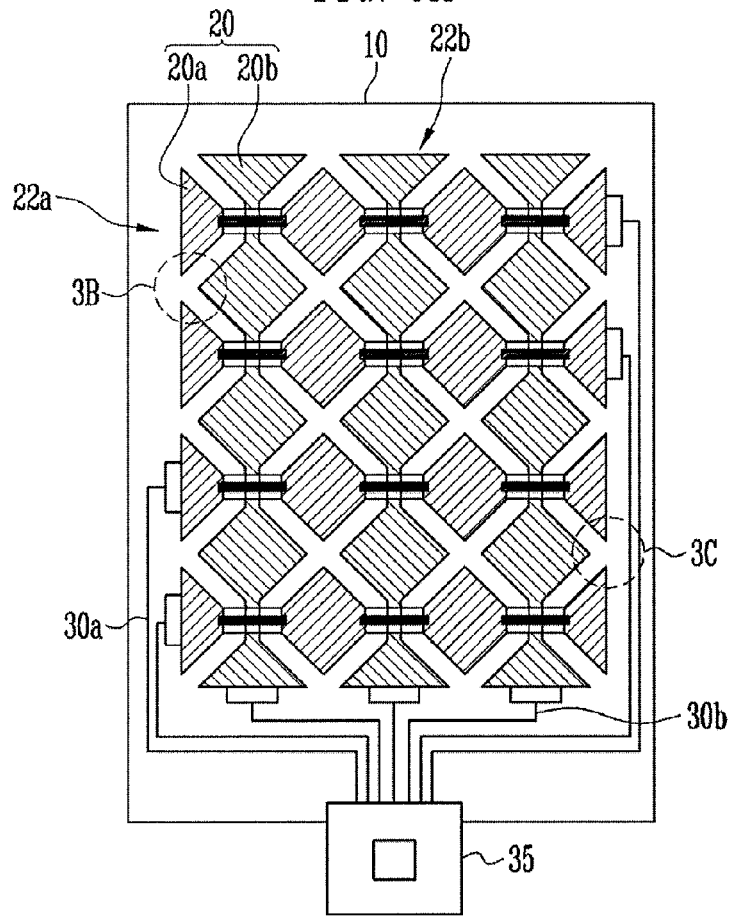
FIG. 3A illustrates a schematic plan view of a touch screen panel.
Figure 3B:
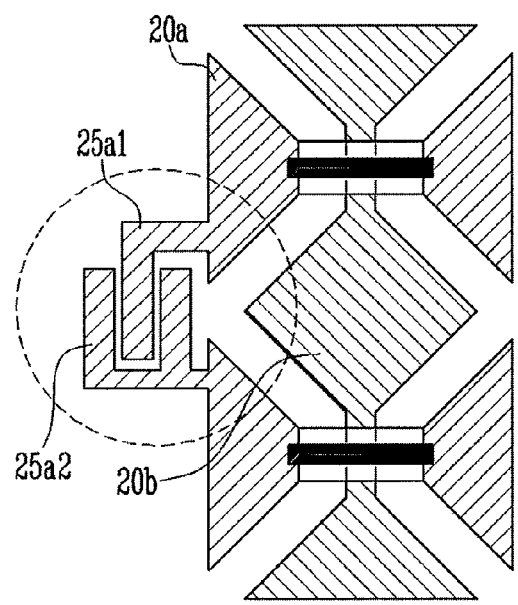
FIGS. 3B and 3C illustrate enlarged views of compensation patterns formed in the touch screen panel of FIG. 2A.
Figure 3C:
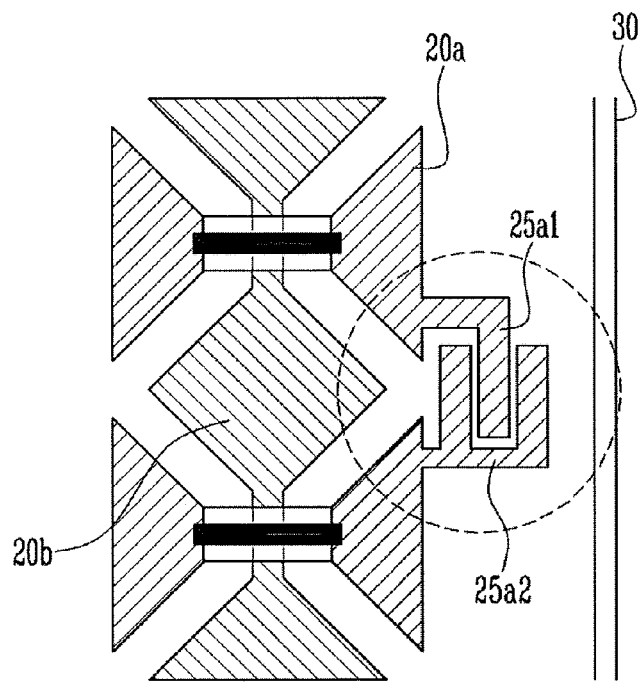

The first and second compensation patterns 25a and 25b may be in the non-active area NA so that the visualization of the first and second compensation patterns 25a and 25b is prevented. The first and second compensation patterns 25a and 25b may include the same material in the same layer as the first and second sensing electrodes 20a,b for the purpose of process simplification. The first and second compensation patterns 25a and 25b may include a low-resistance opaque metal material, like the first connecting patterns 21a and the row outer lines 30a. The first and second compensation patterns 25a and 25b may be alternately arranged along the second direction D2, and each of the first and second compensation patterns 25a and 25b may be extended to opposite to the adjacent compensation pattern at a predetermined space. Each of the first and second compensation patterns 25a and 25b may in a shape bent or branched in a direction toward the adjacent compensation pattern. For example, as illustrated in FIG. 2D, the first compensation pattern 25a may include a rectangular pattern. The first width W1 of the first compensation pattern 25a may be about 0.2 mm, and the first length L1 of the first compensation pattern 25a may be about 4 mm. Like the first compensation pattern 25a, the second width W2 of the second compensation pattern 25b may be about 0.2 mm, and the second length L2 of the second compensation pattern 25b may be about 4 mm. The space S between the first and second compensation patterns 25a and 25b may be about 0.03 mm. However, the positions, shapes, sizes and materials of the first and second compensation patterns 25a and 25b may be variously modified.

The compensation value of capacitance may be determined by adjusting the areas of the first and second compensation patterns 25a and 25b and the space between the first and second compensation patterns 25a and 25b. The first and second compensation patterns 25a and 25b may form a pair to compensate for capacitance. Alternatively, only the first compensation patterns 25a without the second compensation patterns 25b may be formed to compensate for capacitance. The outer lines 30 may be formed to be distributed to both left and right sides of the active area AA so as to efficiently use the non-active area NA. The positions of the outer lines 30 may be variously modified. The positions of the first compensation patterns 25a connected to the opposite sides of the row outer lines 30a may also be variously modified. The positions of the second compensation patterns 25b connected to the opposite sides of the column outer lines 30b may also be variously modified.

FIGS. 3A, 3B, 3C, and 4 illustrate views of other embodiments of the compensation patterns. Referring to FIG. 3, the first compensation patterns 25a may have a structure in which adjacent first compensation patterns 25a1 and 25a2 are extended opposite to each other at a predetermined space. The first compensation patterns 25a1 and 25a2 connected to ends of the first sensing electrodes 20a may be adjacent to form a predetermined capacitance. It may be possible to compensate for the self-capacitance between the first sensing electrodes 20a.

Figure 4:
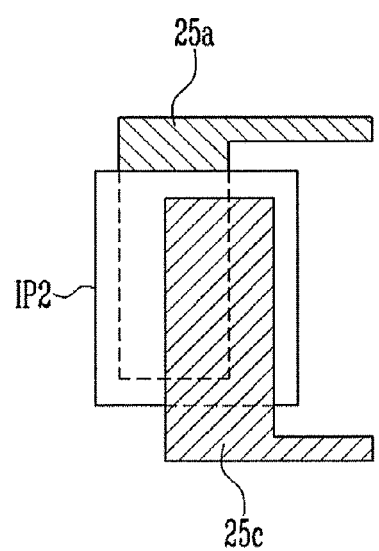
FIG. 4 illustrates an enlarged view of compensation patterns having overlapping portions according to an embodiment.

Referring to FIG. 4, the touch screen panel may include third compensation patterns 25c connected to the second sensing electrodes 20b and each may have at least one portion overlapped with an adjacent first compensation pattern 25a. The first compensation patterns 25a connected to the first sensing electrodes 20a and the third compensation patterns 25c connected to the second sensing electrodes 20b may be in different layers from each other, to compensate for the mutual capacitance between the first and second sensing electrodes 20a and 20b. The third compensation patterns 25c may be formed in the same layer as the first connecting patterns 21a. Second insulating patterns IP2 may be formed between the first and third compensation patterns 25a and 25c. The area occupied in the non-active area NA may be decreased by the overlap between the first and third compensation patterns 25a and 25c.

By way of summation and review, in a touch screen panel, electrical characteristics of sensing electrodes, for example, resistance and capacitance may be changed depending on the positions of the sensing electrodes. The resistance may be relatively low in areas connected to outer lines among the sensing electrodes where current is flowed. The resistance may be relatively high in the opposite areas, i.e., end areas of the sensing electrodes. As the electrical characteristics of the sensing electrodes may have a variation for each area, an RC delay value or capacitance charging time may be increased in an end area of the sensing electrodes. The touch sensitivity of the sensing electrodes may be deteriorated, or the noise preventing ability of the sensing electrodes may be reduced. Compensation patterns for compensating for a variation in capacitance may be formed at ends of the sensing electrodes, so that the variation in electrical characteristics can be decreased, thereby preventing the lowering of touch sensitivity. The compensation patterns can be selectively applied to compensate for the mutual capacitance between the first and second sensing electrodes or the self-capacitance between the first sensing electrodes.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A touch screen panel, comprising:
    a substrate divided into an active area and a non-active area, the non-active area being at the periphery of the active area;
    a plurality of first sensing electrodes arranged in row lines in the active area, respective row lines having a first row line end and a second row line end opposite the first row line end;
    a plurality of second sensing electrodes arranged in column lines in the active area, respective column lines having a first column line end and a second column end opposite the first column line end;
    a plurality of row outer lines in the non-active area, the row outer lines being electrically connected to respective first row line ends;
    a plurality of column outer lines in the non-active area, the column outer lines being electrically connected to respective first column line ends; and
    first and second compensation patterns, each first compensation pattern being electrically connected to a respective second row line end and having a corresponding second compensation pattern that is between the first compensation pattern and is electrically connected to a column line adjacent the second row line end.

2. The touch screen panel as claimed in claim 1, wherein the row lines extend along a first direction, the plurality of second sensing electrodes are interspersed between the first sensing electrodes, and the column lines extend along a second direction intersecting the first direction.

3. The touch screen panel as claimed in claim 2, further comprising:
    a plurality of first connecting patterns connecting the first sensing electrodes along the first direction; and
    a plurality of second connecting patterns connecting the second sensing electrodes along the second direction.

4. The touch screen panel as claimed in claim 3, wherein the first connecting patterns are separated from the first sensing electrodes, and connect the first sensing electrodes for each line along the first direction while being electrically connected to the first sensing electrodes above or below the first sensing electrodes.

5. The touch screen panel as claimed in claim 4, further comprising first insulating patterns between the first connecting patterns and the second connecting patterns.

6. The touch screen panel as claimed in claim 2, wherein the first and second directions are perpendicular to each other.

7. The touch screen panel as claimed in claim 1, wherein the first compensation patterns are extended so that adjacent first compensation patterns are opposite to each other at a predetermined interval.

8. The touch screen panel as claimed in claim 1, wherein the second compensation patterns are extended so that adjacent second compensation patterns are opposite to each other at a predetermined interval.

9. The touch screen panel as claimed in claim 8, wherein the first and second compensation patterns are in the same layer as the sensing electrodes in the non-active area.

10. The touch screen panel as claimed in claim 1, wherein the first and second compensation patterns are alternately arranged along the second direction.

11. The touch screen panel as claimed in claim 10, wherein each of the first and second compensation patterns is extended opposite to an adjacent compensation pattern at a predetermined interval.

12. The touch screen panel as claimed in claim 11, wherein the first and second compensation patterns are spaced apart from each other by about 0.03 mm.

13. The touch screen panel as claimed in claim 11, wherein each of the first and second compensation patterns has a bent or branched shape in a direction toward the adjacent compensation pattern.

14. The touch screen panel as claimed in claim 13, wherein each of the first and second compensation patterns is complementary to the adjacent compensation pattern.

15. The touch screen panel as claimed in claim 14, wherein one compensation pattern of adjacent first and second compensation patterns has at least two prongs, the other compensation pattern has at least one prong, and the prong of the latter is between the two adjacent prongs of the former.

16. The touch screen panel as claimed in claim 15, wherein the first compensation pattern has at least one prong and the second compensation pattern has at least two prongs.

17. The touch screen panel as claimed in claim 15, wherein all of the prongs lie in a common plane.

18. The touch screen panel as claimed in claim 1, further comprising third compensation patterns electrically connected to the second sensing electrodes, the third compensation patterns each having at least one portion overlapped with an adjacent first compensation pattern.

19. The touch screen panel as claimed in claim 18, further comprising second insulating patterns between the first compensation patterns and the third compensation patterns.

20. A touch screen panel, comprising:
   a substrate divided into an active area and a non-active area, the non-active area being at the periphery of the active area;
   a plurality of first sensing electrodes arranged in row lines in the active area, respective row lines having a first row line end and a second row line end opposite the first row line end;
   a plurality of second sensing electrodes arranged in column lines in the active area, respective column lines having a first column line end and a second column end opposite the first column line end;
   a plurality of row outer lines in the non-active area, the row outer lines being electrically connected to respective first row line ends;
   a plurality of column outer lines in the non-active area, the column outer lines being electrically connected to respective first column line ends; and
   first compensation patterns, each first compensation pattern being electrically connected to a respective second row line end, and second compensation patterns, each second compensation pattern being electrically connected to a column line adjacent to the second row line end, one of the first and second compensation patterns having a branched shape and the other of the first and second compensation patterns having a bent shape that extends between branches of the branched shape.

* * * * *